United States Patent
Tippmann et al.

(10) Patent No.: US 6,619,189 B1
(45) Date of Patent: Sep. 16, 2003

(54) FOOD RETHERMALIZING, COOKING AND HOLDING APPARATUS AND METHOD

(75) Inventors: Edward Tippmann, Fort Wayne, IN (US); Barry Tippmann, Fort Wayne, IN (US)

(73) Assignee: Thermodyne Food Service Product, Inc., Fort Wayne, IN (US)

( * ) Notice: Subject to any disclaimer, the term of this patent is extended or adjusted under 35 U.S.C. 154(b) by 0 days.

(21) Appl. No.: 10/314,390

(22) Filed: Dec. 9, 2002

(51) Int. Cl.[7] .............................. A23L 1/00; A23L 3/00; A21B 1/08; A47J 27/00; F25B 29/00
(52) U.S. Cl. .............................. 99/330; 99/331; 99/468; 99/476; 99/483; 126/20; 126/21 A; 165/11.1; 165/64; 219/400; 219/401
(58) Field of Search .............................. 99/326–333, 337, 99/338, 339, 340, 341, 403–410, 400, 401, 415–418, 444–450, 467, 468, 469, 470, 474–479, 483; 366/101, 107; 126/20, 369, 21 A, 374.1, 388.1; 62/376, 64, 373, 237; 165/2, 206, 11.1, 253, 48.1, 12, 64; 426/510, 523; 312/236; 219/400, 401, 392, 394, 385–387, 478, 480, 521

(56) References Cited

U.S. PATENT DOCUMENTS

| 3,744,474 A | * | 7/1973 | Shaw ........................ 99/330 X |
| 4,426,923 A | * | 1/1984 | Ohata ........................... 99/468 |
| 4,700,685 A | * | 10/1987 | Miller ..................... 99/468 X |
| 5,093,556 A | * | 3/1992 | Oelfke ........................ 219/386 |
| 5,445,062 A | * | 8/1995 | Polster ................... 99/450 X |
| 5,590,587 A | * | 1/1997 | Polster ................... 99/483 X |
| 5,613,423 A | * | 3/1997 | Polster ........................ 99/330 |
| 6,124,572 A | * | 9/2000 | Spilger et al. .............. 219/400 |

* cited by examiner

Primary Examiner—Timothy F. Simone
(74) Attorney, Agent, or Firm—Birch, Stewart, Kolasch & Birch, LLP

(57) ABSTRACT

An apparatus is disclosed in the form of a cabinet having doors and interior side walls with supports for receiving trays of food products to be rapidly rethermalized and held. The apparatus can also condition the rethermalized food product, as well as act as a cooking oven. A steam generator is provided for supplying steam to the cabinet interior where it is continuously mixed with air. Thermocouples control both the steam and air mixture temperature for rethermalizing cooking and holding the food products and an air heater for conditioning the food products prior to use.

12 Claims, 3 Drawing Sheets

FOOD RETHERMALIZING, COOKING AND HOLDING APPARATUS AND METHOD

The field of the present invention relates to steam devices and method for rethermalizing food products and holding the rethermalized food products at desired temperatures, including cooking and then conditioning the food products prior to use. More particularly, the invention relates to an oven-type device, which utilizes a steam and air mixture to rethermalize the food products.

BACKGROUND OF THE INVENTION

The rethermalization of foods and the ability to hold the rethermalized foods for periods of time and at temperatures where the foods are ready for consumption is old in the art. For example, if the foods are prepared in final consumption form prior to freezing or where the foods are ready for further processing, e.g. cooking, in a thawed state, larger institutions, such as schools, hospitals and restaurants, use such rethermalization. Time and labor can be saved if the frozen foods can be taken from a freezer and immediately rethermalized without the necessity of subjecting the foods to a slow defrosting step, which could result in bacterial growth.

The low rate of heat transfer in conventional rethermalizers, e.g. hot air ovens, and the limited capacity of microwave ovens make them undesirable for rethermalization of frozen foods. However, as is known, the latent heat of vaporization makes steam a very effective heat transfer medium because of the large amount of thermal energy contained in the steam. As steam condenses on a food product, this thermal energy will be transferred directly to the food product. Steam is, thus, a much more effective heat transfer medium than hot air. However, because low-pressure steam is generated at a temperature of approximately 212° F., steam is generally too hot for direct contact with food products and, thus, can cause damage to some food products. Accordingly, rethermalizing with steam has not been satisfactory for most rethermalizing uses.

SUMMARY OF THE INVENTION

Applicants have discovered that by continuously mixing air with low pressure steam and circulating the mixture around the food products, with controlled temperatures of the mixture below 212° F., fast, but safe rethermalization of food products can result. This steam-air mixture of the present invention can be established to provide any desired condensing temperature or dewpoint and therefore rethermalize the food products with a high heat transfer rate but at a safe temperature below 212° F. Preferably, the steam and air are continuously mixed together.

Further, according to the invention, when the rethermalized food products are left in the present rethermalizer, dry, hot air (without steam) is circulated around the rethermalized food products, and the condition and appearance of the food products can be improved by the evaporation of condensed steam remaining on the products, while at the same time the temperature of the food products is maintained, thus making the food products ready for consumption or further processing as the case may be.

As noted above, the thawing and cooking of food products by circulating steam thereover is not now. Examples of devices for thawing, cooking or otherwise treating food products with steam are disclosed in U.S. Pat. Nos. 3,744,474, 4,426,923, 4,700,685 and 5,613,423. However, none of these patents disclose a device for rapidly rethermalizing food products at temperatures below 212° F. without the use of some additional device, such as a vacuum pump, to lower the pressure in a cabinet. Also, as noted above, rethermalizing at or above 212° F. can damage some food products. In contrast, the present invention has the advantage to condition the food products utilizing dry, hot air, and thus also avoids the necessity of having to physically move the food products from the thermalizing device.

Thus, briefly stated, the present invention provides a device for rethermalizing food products. An oven chamber has side, top and bottom walls in which at least one is provided with a door to provide access into the chamber. Spaced-apart supports on the side walls support trays in the chamber for containing the food products. A steam generator is provided for generating steam. A plenum adjacent one of the walls has inlets and outlets between the plenum and the chamber. A fan in the plenum mixes air with the steam and moves the mixture from the inlets, through the plenum, to the outlets, preferably horizontally, across a top of each tray, and back to the inlets. A controller controls temperatures of the air and steam mixture to temperatures below 212° F. to rethermalize the food products, in part, by the steam in the mixture condensing thereon.

DESCRIPTION OF PREFERRED EMBODIMENTS

Figure 1:
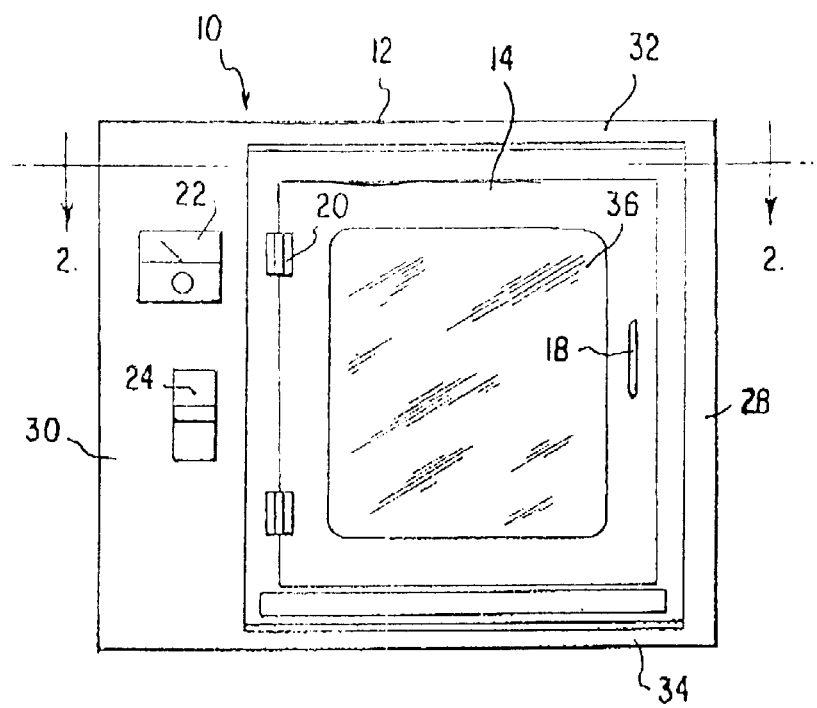
FIG. 1 is a side view of the present rethermalizer.
Figure 2:
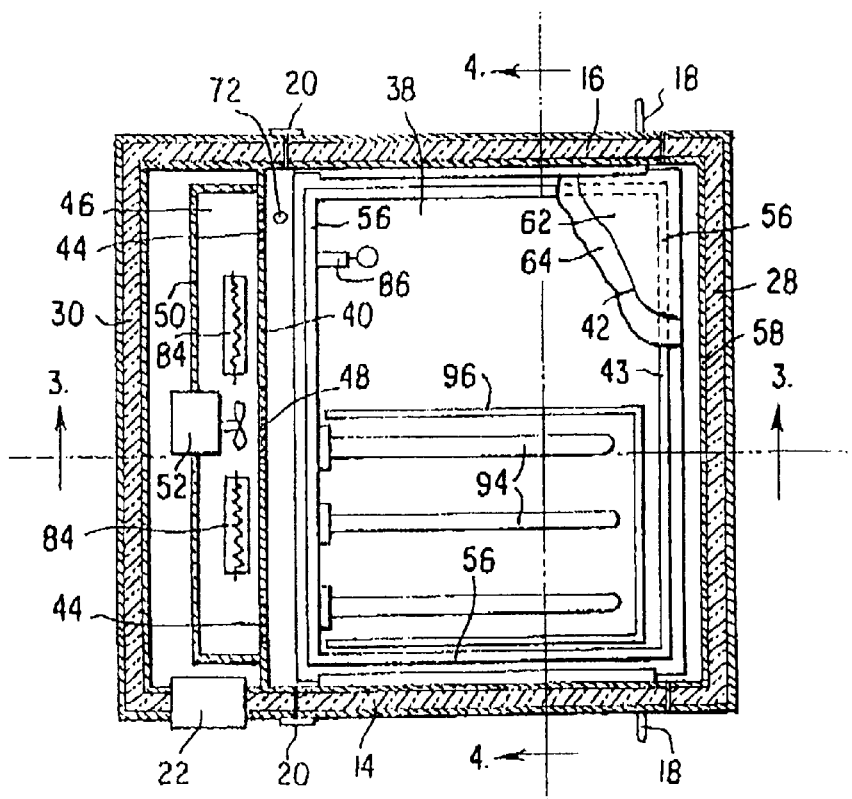
FIG. 2 is a sectional top view along lines 2—2 of FIG. 1.
Figure 3:
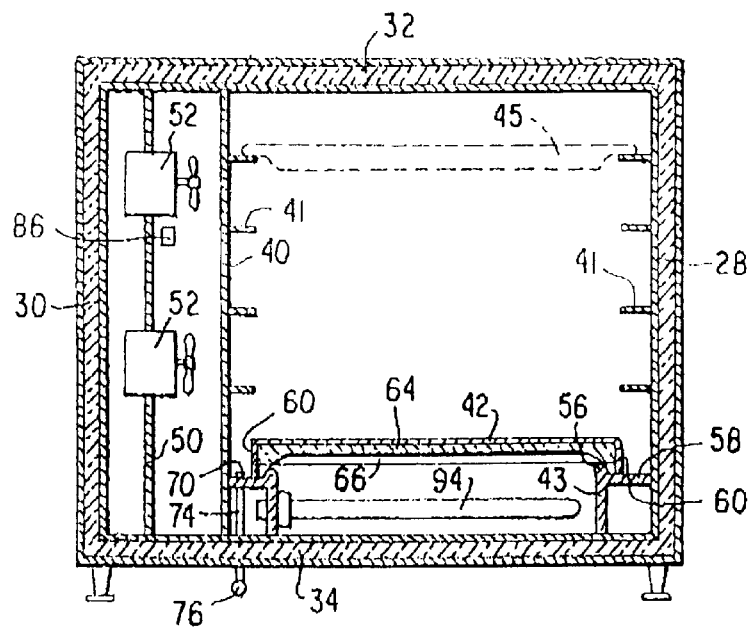
FIG. 3 is a sectional side view along lines 3—3 of FIG. 2.
Figure 4:
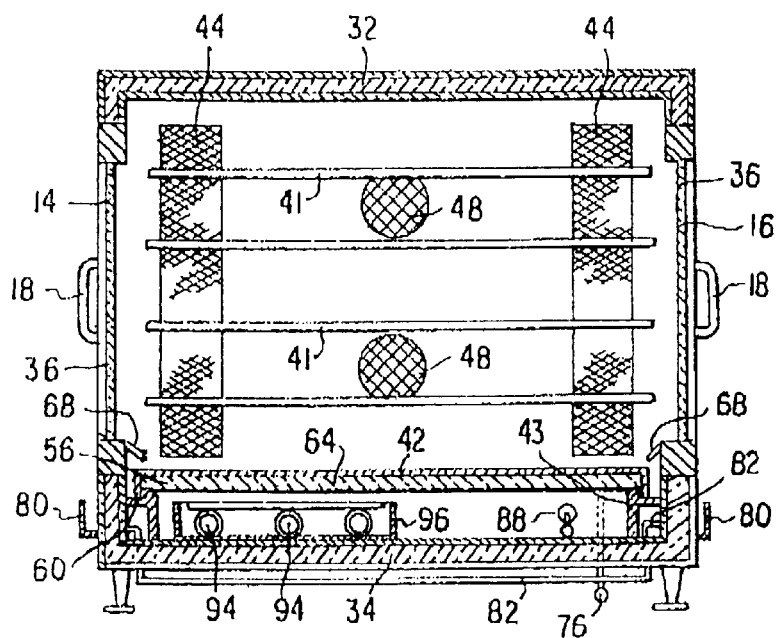
FIG. 4 is a sectional side view along lines 4—4 of FIG. 2.

Referring now to FIGS. 1–4, wherein the same reference numerals indicate the same parts throughout the several views, rethermalizing, cooking, holding and conditioning device 10 is shown including cabinet 12 having doors 14, 16 (see FIGS. 1 and 2), which are secured by means of a latch 18. The doors 14, 16 are supported by hinges 20. A control panel 22 is provided, as well as a switch 24 and a temperature controller 26 (see FIG. 5), the function of which will be more fully described below. As shown in FIG. 1, cabinet 12 further has side walls 28 and 30, a top wall 32 and a bottom wall 34. The walls of the cabinet 12 have insulating material between wall panels of the walls as in conventional ovens and the doors 14, 16 have insulation around the glazing 36 on each.

The walls of cabinet 12, in part, form an oven chamber 38 (see FIG. 2), which chamber is defined by top wall 32, side wall 28, partition 40 and removable cover 42 (also see FIG. 3) for a pan 43. A plurality of horizontally, spaced-apart supports, e.g. rails, 41 are secured to, or integrally formed with, partition 40 and side wall 28 to support a plurality of trays 45 (in phantom lines in FIG. 3) on which food products can be supported during rethermalizing, cooking, conditioning and holding. Partition 40 has vertically extending openings forming inlets 44 (see FIGS. 2 and 4) to plenum 46 from chamber 38 and openings forming outlets 48 from the plenum 46 back to chamber 38. The plenum 46 is further defined by an interior wall 50 (see FIGS. 2 and 3) to which are mounted a plurality of fans 52 adjacent outlets 48. The term "fans" is intended herein to include any desired gas mover, e.g. blowers, jets, etc. The fans 52 circulate a steam-air mixture, in one mode of operation, or warmed air, in another mode of operation, as will be more fully described below, from the inlets 44, through the plenum 46, through outlets 48, through the chamber 38 and back to inlets 44. The inlets 44 are preferably spaced apart and perpendicular to the horizontally extending trays 45 (see FIGS. 3 and 4) so that the circulated steam-air or warmed air can pass over the top and parallel to each tray 45 and around food products placed thereon.

A preferred low pressure steam generator has a pan 43 which is further defined by an upwardly projecting ridge 56 (see FIG. 3) extending around an upper edge of the pan 43. The ridge 56 has a horizontally extending surface 58 in the form of a flange which extends from the ridge 56 to the side wall 28 and partition 40 and to a location adjacent doors 14, 16. A pan cover 42 has a downwardly depending peripheral flange 60 around a top surface 62 (see FIG. 2) which rests on surface 58 and completely covers the opened top of pan 43. The pan cover 42 further is provided with a layer of insulation 64, preferably beneath the surface 62 (see FIG. 2) and the flange 60 has openings 66 formed on opposite sides thereof to permit steam generated in pan 43 to flow into chamber 38. The pan cover 42 also serves to prevent circulating air from contacting the surface of the water in the pan and evaporating the water or heating the air above a desired setpoint.

While the above-described pan-form steam generator is preferred, quite obviously, any other conventional steam generator in or outside cabinet 12 could be used.

The doors 14, 16 are provided on their interior lower edge portion with a condensation deflection shield 68 (see FIG. 4) which extends over the horizontally extending surface 58 to permit any condensation from the inside surface of doors 14, 16 and associated glazing to run down and be deflected onto surface 58. In addition, any condensation forming on the interior surfaces of chamber 38 is permitted to run down or be collected on surface 58. A drain 70 (see FIG. 3) is provided having an opening 72 (see FIG. 2) in surface 58 and is connected by piping 74 (see FIG. 3) to a drain outlet 76 beneath the cabinet 12. The opening 72 is threaded to receive a plug (not shown) which when threaded into opening 72 causes any condensate collected on surface 58 to build up and eventually run back into pan 43 rather than to outlet 76. An outside lower edge portion of cabinet 12 beneath the doors 14, 16 has a trough 80 (see FIG. 4) mounted thereon for collecting any condensate running down the outside surface of the doors. A drain pipe 82 connects the inside of the trough 88 to a drain outlet 76.

A heating element(s) 84, which may be of any desired type, but preferably an electric heating element (see FIG. 2), is located in plenum 46 (see FIG. 2) in the path of air flowing therethrough so as to heat the air prior to its discharge through outlets 48. A thermocouple 86 is also located in the chamber 38, the operation of which will be more fully described below.

The level of water in pan 43 is controlled by float switch 88 (see FIGS. 4 and 5) which, in turn, controls a solenoid valve 90 (see FIG. 5) in water feed line 92. A plurality of heating elements 94, especially electrical heating elements, are associated with or mounted on a wall of the pan 43 and such electric heating elements extend a distance into the water to heat the water and turn it into low pressure steam, e.g. atmospheric steam. Typically, three electrical heating elements 94 would be used, each of which can advantageously be connected to a separate phase line of a three-phase electric power service input or connected in parallel to a single-phase input. The heating elements 94 are surrounded on three sides by a U-shaped trough 96 (see FIG. 2) resting on the bottom of pan 43. The trough 96 is opened at one end to permit water from the pan to slowly enter as it is being boiled away into steam. By thus keeping the quantity of water adjacent the length of the heating elements 94 small, steam can be immediately and rapidly generated as the heating elements are energized, thus eliminating the necessity of heating the entire quantity of water in the pan 43 to form the steam.

The present invention also contemplates the use of the identical devices 10 ideally placed in side-by-side relationship. Rethermalized food products being held in one unit would be ready of immediate use, while food products could be simultaneously loaded and rethermalized in the adjacent unit. The only operational connection between the two units may be a device to ensure that the water heating elements of both units would not be simultaneously energized due to the excessive electric power consumption caused by such an occurrence.

As an alternative, the device 10 could be constructed without the heating element 84 (see FIG. 2) so that it only operates for rethermalizing of food products without the "conditioning" features, as described above.

In addition, the controller 26 (see FIG. 5) could be the type that has a timing feature such that after food has been rethermalized for a first period of time at, for example, 200° F., the controller 26 would switch to a holding temperature of, for example 170° F., for a second period of time.

In order to prevent damage to the heating element 94 or a possible fire hazard in the event the water level in the pan 43 falls below elements 94, a thermocouple may be mounted on the upper surface of the element 94 and connected to high temperature cutout 95 (see FIG. 5) in the line feeding power to element 94.

OPERATION

Figure 5:
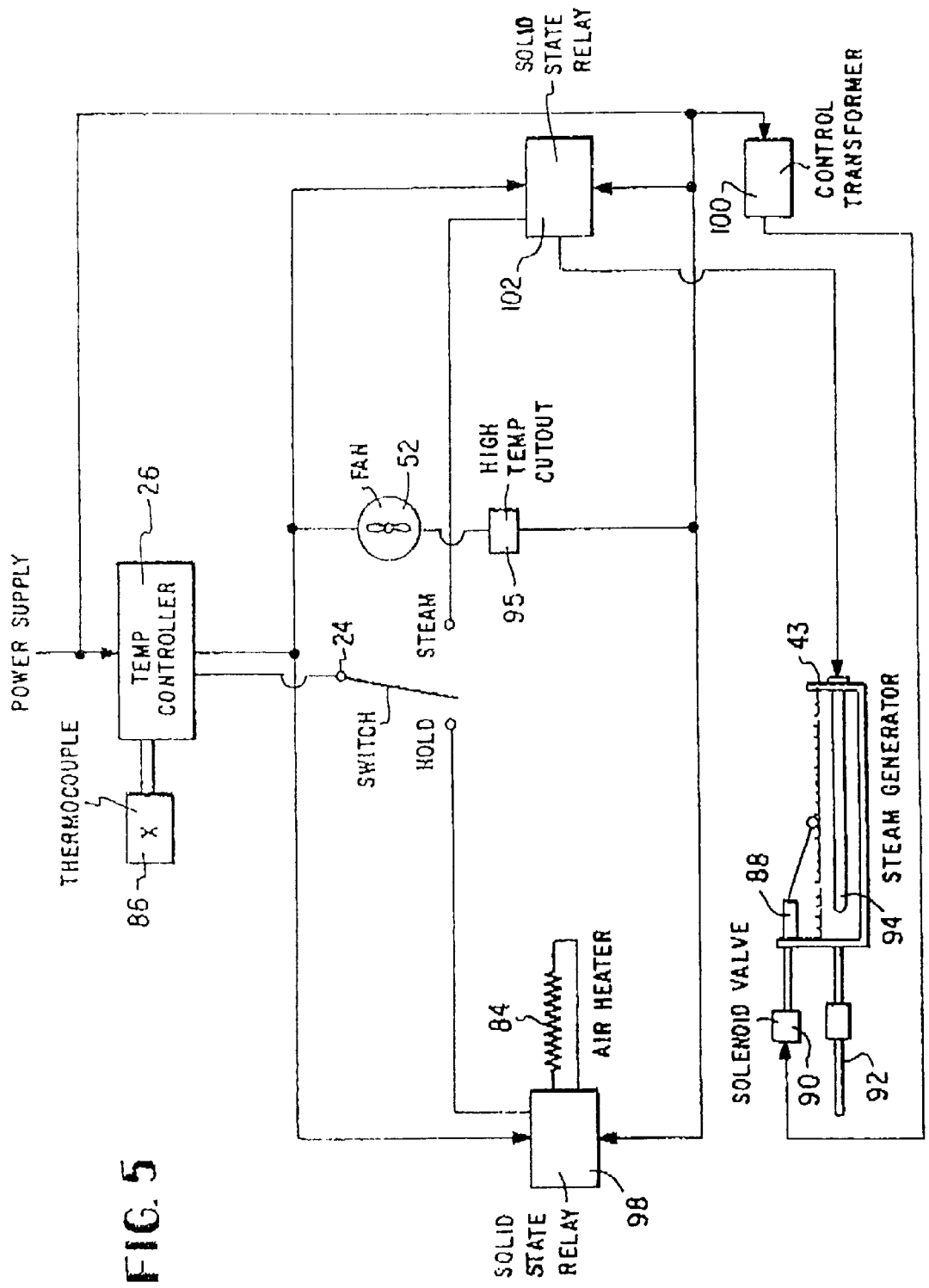
FIG. 5 is an illustration of a typical wiring diagram for control and operation of the device.

Referring now to the Figures, and in particular to FIG. 5 thereof, the operation of the device 10 will now be described. After the food products have been loaded onto trays 45 in chamber 38, the temperature controller 26 is first set to the desired temperature to be maintained in chamber 38 to rethermalize or cook the food products, e.g. 160° F. to 210° F. Switch 24 is then moved to the "steam" position. Thermocouple 86 senses that the temperature in plenum 46 is below the set temperature of approximately, for example, 170° F. and causes temperature controller 26 to energize solid state relay 102, which in turn energizes water heating elements 94. The fans 52 are, preferably, connected to always be in operation as long as the main power to the device 10 is on.

As generated steam rises and enters chamber 38 from beneath pan cover 42, it mixes with air in the chamber 38 and the mixture is drawn into inlets 44, through plenum 46, one outlets 48 and, preferably, over the top of the trays 45. The steam generated mixes with the air in the chamber 38 and settles on the food products positioned on the trays where it condenses and gives up its thermal energy directly to the food products, thus, rethermalizing or cooking the food products.

Once the food products have been rethermalized (this process can be controlled by a timer—not shown), the switch 26 is moved to the "hold" position, thus ending steam generation. The temperature controller 26, still operating in response to signals from thermocouple 86 in plenum 46, causes solid state relay 98 to energize heating element 84. The circulated hot air now causes evaporation of any remaining condensed steam in the chamber 38 as well as that on the food products, thus, in effect, "conditioning" the food products both as to appearance and feel. After the condensed steam has been evaporated, the rethermalized and conditioned food products are held at the temperature set on the controller 26 and are ready for serving or further processing. A transformer 100 may be used to provide a control voltage for the energization of solenoid valve 90.

If dual units are employed in side-by-side relationship, it may be desirable, but not necessary, to provide a means to ensure that the water heater elements of both units are not on at the same time due to the great amount of electrical current that their combined usage could draw which may overload the electric supply circuit. This could, for example, consist of a normally closed relay that could be connected in the control circuit to ensure that both water heat elements could not be energized at the same time. The operation of the single or dual units could also be handled by a programmable device, rather than manually as shown. In addition, the door(s) 14, 16 could have a switch actuated by the door to shut off the fan when the door is opened.

What is claimed:

1. A device for rethermalizing food products comprising:
   a) a chamber having side, top and bottom walls, at least one of which is provided with a door to provide access into the chamber, and spaced-apart supports on the side walls for supporting trays in the chamber for containing the food products;
   b) a steam generator for generating steam;
   c) a plenum adjacent one of the walls and having spaced-apart inlets and outlets between the plenum and the chamber;
   d) a fan in the plenum for mixing air with the steam and moving the mixture from the inlets, through the plenum, to the outlets, across each tray, and back to the inlets; and
   e) a controller for controlling the temperatures of the air and steam mixture to temperatures below 212° F. to rethermalize the food products by, in part, steam condensing thereon.

2. A device as set forth in claim 1, wherein a heating element is provided within the plenum for heating air or the air and steam mixture.

3. A device as set forth in claim 1, wherein the fan operates substantially continuously to mix the air and steam.

4. A device as set forth in claim 1, wherein the steam generator comprises a pan for holding water therein and a water heating element in the pan.

5. A device as set forth in claim 4, wherein the pan has a trough for holding a small quantity of the water adjacent the water heating element to enable the water heating element to more rapidly turn the water adjacent thereto into steam upon energization thereof.

6. A device as set forth in claim 4, further comprising a cover over the pan to minimize contact of circulating air and steam mixture with the water in the pan.

7. A device as set forth in claim 4, further comprising a float in the pan for maintaining a desired level of water in the pan.

8. A device for rethermalizing and holding food products, comprising:
   a) a chamber having side, rear, top and bottom walls, at least one of which is provided with a door to provide access into the chamber, and spaced-apart supports on the side walls for supporting trays in the chamber for containing the food products;
   b) a steam generator for generating steam;
   c) a plenum adjacent one of the walls and having a heating element therein, and spaced-apart inlets and outlets between the plenum and the chamber, and including a fan in the plenum for mixing air with the steam and for circulating the mixture from the inlets, through the plenum, by the heating element, to the outlets, across each tray and back to the inlets;
   d) a temperature sensor in the plenum for generating a signal indicative of temperatures of the mixture flowing therethrough;
   e) a controller for providing a control signal in response to the temperatures; and
   f) a controller to switch to either steam-air heating to rethermalize the food products by steam condensing thereon or to air heating alone to evaporate condensation on the food products prior to the food products use, said controller serving to maintain temperatures of air passing through the plenum.

9. A device as set forth in claim 8, wherein the steam generator comprises a pan for holding water therein, a water heating element in the pan, and a trough in the pan for holding a small quantity of said water adjacent to the water heating element to enable the water heating element to rapidly turn the water adjacent thereto into steam upon energization thereof.

10. A device as set forth in claim 8, further comprising a cover over the pan to minimize contact of circulating air and steam mixture with the water in said pan.

11. A device as set forth in claim 9, further comprising a float in the pan for maintaining a desired level of water in the pan.

12. A device as set forth in claim 8, wherein the fan operates continuously to mix the air and steam.

* * * * *